(12) United States Patent
Ulrich et al.

(10) Patent No.: US 8,817,368 B2
(45) Date of Patent: Aug. 26, 2014

(54) LENS FOR EVANESCENT WAVE ILLUMINATION AND CORRESPONDING MICROSCOPE

(75) Inventors: Heinrich Ulrich, Heidelberg (DE); Werner Knebel, Kronau (DE); Kyra Moellmann, Trippstadt (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 914 days.

(21) Appl. No.: 11/414,805

(22) Filed: May 1, 2006

(65) Prior Publication Data

US 2008/0266659 A1  Oct. 30, 2008

Related U.S. Application Data

(63) Continuation of application No. PCT/EP2004/052295, filed on Sep. 23, 2004.

(30) Foreign Application Priority Data

Sep. 25, 2003 (DE) .................................. 103 44 410
Sep. 10, 2004 (DE) .......................... 10 2004 044 274

(51) Int. Cl.
  *G02B 21/06* (2006.01)
  *G02B 21/00* (2006.01)
  *G02B 21/10* (2006.01)
  *G02B 21/08* (2006.01)

(52) U.S. Cl.
  CPC .............. *G02B 21/10* (2013.01); *G02B 21/084* (2013.01); *G02B 21/06* (2013.01); *G02B 21/00* (2013.01)
  USPC ............................ 359/385; 359/368; 359/387

(58) Field of Classification Search
  CPC ...... G02B 21/00; G02B 21/06; G02B 21/084; G02B 21/10
  USPC .................................................. 359/368–390
  See application file for complete search history.

(56) References Cited

U.S. PATENT DOCUMENTS

| 4,291,938 | A  |   | 9/1981  | Wagner et al. |
| 4,852,985 | A  | * | 8/1989  | Fujihara et al. ............... 359/387 |
| 5,675,145 | A  | * | 10/1997 | Toda et al. .................... 250/234 |
| 5,774,221 | A  |   | 6/1998  | Guerra et al. |
| 6,316,153 | B1 | * | 11/2001 | Goodman et al. ................ 430/8 |
| 6,504,653 | B2 |   | 1/2003  | Matthae et al. |
| 6,987,609 | B2 |   | 1/2006  | Tischer et al. |
| 7,808,699 | B2 | * | 10/2010 | Ulrich et al. .................. 359/385 |
| 2002/0097489 | A1 |  | 7/2002  | Kawano et al. |

(Continued)

FOREIGN PATENT DOCUMENTS

| DE | 101 08 796 A1 | 9/2002 |
| DE | 101 43 481 A1 | 3/2003 |

(Continued)

OTHER PUBLICATIONS

Oheim, M. et al., "Multiparameter Evanescent-Wave Imaging in Biological Fluorescence Microscopy," IEEE Journal of Quantum Electronics, vol. 38, No. 2, Feb. 2002, pp. 142-148.

*Primary Examiner* — Thong Nguyen
(74) *Attorney, Agent, or Firm* — Patentbar International, P.C.

(57) ABSTRACT

A light source and/or a deflector and/or the emitting end of an illuminating optical fiber is arranged in the rear focal plane of a lens for total internal reflection microscopy.

23 Claims, 5 Drawing Sheets

(56) References Cited

U.S. PATENT DOCUMENTS

| | | |
|---|---|---|
| 2003/0058530 A1 | 3/2003 | Kawano |
| 2004/0001253 A1 | 1/2004 | Abe et al. |
| 2004/0047032 A1 | 3/2004 | Gonschor et al. |
| 2007/0097496 A1* | 5/2007 | Ulrich et al. ............... 359/385 |
| 2009/0086211 A1* | 4/2009 | Dosaka et al. ............. 356/445 |

FOREIGN PATENT DOCUMENTS

| | | |
|---|---|---|
| DE | 102 17 098 | 11/2003 |
| DE | 102 29 935 | 1/2004 |
| EP | 0 504 940 | 9/1992 |
| EP | 1 150 154 | 10/2001 |
| WO | WO 02/073171 | 9/2002 |

* cited by examiner

LENS FOR EVANESCENT WAVE ILLUMINATION AND CORRESPONDING MICROSCOPE

RELATED APPLICATIONS

This application is a Continuation of PCT application Ser. No. PCT/EP2004/052295 filed on Sep. 23, 2004, which in turn claims priority to German Patent Application Nos. DE 103 44 410.6 filed on Sep. 25, 2003 and DE 10 2004 044 274.6 filed on Sep. 10, 2004, all of which are incorporated herein by reference in their entirety.

FIELD OF THE INVENTION

The invention relates to an objective for total internal reflection microscopy.

The invention further relates to a microscope for total internal reflection microscopy with a light source and with an objective.

BACKGROUND OF THE INVENTION

A microscope with evanescent illumination of a sample is known from U.S. Publication No. 2002/0097489 A1. The microscope comprises a white light source, the light of which is coupled for the purpose of evanescent illumination via a slit aperture through the microscope objective onto a sample holder, which holds a sample. The illumination light propagates itself in the sample holder by means of total internal reflection, whereby the illumination of the sample occurs only in the region of the evanescent field that protrudes from the sample holder. Microscopes of this type are known as "total internal reflection fluorescent microscopes" (TIRFM).

The z-resolution of TIRF microscopes is extraordinarily good because the evanescent field protrudes only about 100 nm into the sample.

A high-aperture objective specifically for TIRF application is known from DE 101 08 796 A1. The objective comprises a first lens with positive refractive power and a second lens with negative refractive power, whereby the focal distance ratio between the two lenses is in the −0.4 and −0.1 range, and the total refractive power is greater than zero. The objective further comprises two positive lenses, the diameter ratio to focal length of which is greater than 0.3 and less than 0.6. The objective further comprises a negative lens and a collecting lens, whereby the negative lens faces the front group, and the focal distance ratio of the negative lens to the collector lens is between −0.5 and −2.

An incident illumination device for TIRF microscopy is known from DE 102 17 098 A1. The incident illumination device comprises an illumination source that emits a polarized illumination beam when in operation, which propagates at an angle to the optical axis and a deflector that deflects the illumination light beam and couples it parallel to the optical axis in the objective. Provision is made in this incident illumination device for the illumination light beam emitted by the illumination source to exhibit a phase difference in the s- and p-polarization directions, and for the deflection arrangement to reflect the illumination light beam x times, whereby $x=(n\times 180°-d)/60°$.

A microscope for total internal reflection microscopy (TIRM) is known from DE 101 43 481 A1. The microscope exhibits a microscope housing and an objective. The illumination light emitted by an illumination device can be coupled via an adapter that can be inserted into the microscope housing.

A microscope with an optical illumination system that enables simple switching between evanescent illumination and reflective illumination is known from U.S. Publication No. 2004/0001253 A1. The illumination system comprises a laser light source, the light of which is coupled in an optical fiber. Furthermore, an outcoupling optic is provided that focuses the light that exits from the fiber onto a rear focal point of the microscope objective. The optical fiber is movable along a plane that is perpendicular to the optical axis of the microscope objective.

A device for coupling light in a microscope is known from DE 102 29 935 A1. Here, a laser light is directed onto a sample in the illuminated field diaphragm plane by a laser light fiber coupling, which is implemented as a slide. The invention is particularly suitable for the TIRF method.

In scanning microscopy, a sample is illuminated with a light beam to observe the detection light emitted by the sample as reflection- or fluorescent light. The focus of an illumination light beam is moved on an object plane with the help of a movable beam deflector, generally by tipping two mirrors, whereby the axes of deflection are usually positioned perpendicular to each other, so that one mirror deflects in the x-direction and the other in the y-direction. The mirrors are tipped with the help, for example, of galvanometric positioners. The power of the light coming from the object is measured dependent on the position of the scanning beam. Generally, the positioners are provided with sensors to determine the actual position of the mirrors. In confocal scanning microscopy in particular, an object is scanned in three dimensions with the focus of a light beam.

A confocal scanning microscope generally comprises a light source, a focusing optic with which the light from the source is focused on a pinhole aperture—the so-called excitation aperture—, a beam splitter, a beam deflector to direct the beam, a microscope optic, a detection aperture, and detectors to detect the detection light or fluorescent light. The illumination light is coupled via a beam splitter. The fluorescent light or reflected light emitted by the object returns to the beam splitter via the beam deflector, passes through it, and is subsequently focused onto the detection aperture, behind which are located the detectors. This arrangement of detectors is called a descan arrangement. Detection light that does not originate directly from the focal region takes another light path and does not pass through the detection aperture so that pixel information is obtained, which is converted into a three-dimensional image by sequential scanning of the object with the focus of the illumination light beam. A 3-dimensional image is generally achieved by layered imaging.

The systems known from the state-of-the-art have the disadvantage that, in part, very costly and space-consuming optics are needed in the beam path of the microscope in order to couple the TIRF illumination light. This has a disadvantageous effect, particularly in the detection beam path, and often leads to a loss in the power of the detection light.

SUMMARY OF THE INVENTION

The task of the present invention is to disclose an objective for use in total internal reflection microscopy that enables particularly efficient coupling of the TIRF illumination light in the beam path of the microscope.

This task is solved by an objective wherein a light source and/or at least one deflector that deflects the light from a light source into the objective and/or the outgoing end of the illumination conducting fiber is arranged in the area of the rear focal plane of the objective.

A further task of the present invention is to disclose a microscope in which coupling of the TIRF illumination light is as efficient and low-loss as possible, and which simultaneously makes additional optics in the beam path of the microscope largely superfluous.

The further task is solved by a microscope wherein the light source and/or at least one deflector that deflects the light source into the objective and/or the outgoing end of the illumination conducting fiber that is supplied by the light source is arranged in the area of the rear focal plane of the objective.

The invention has the advantage that no beam splitters are necessary in the beam path of the microscope to couple the TIRF illumination light. This results in higher fluorescence output—because no signal loss is caused. In addition, high time resolution may be achieved because no optical components, in particular no beam splitters, need to be switched.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
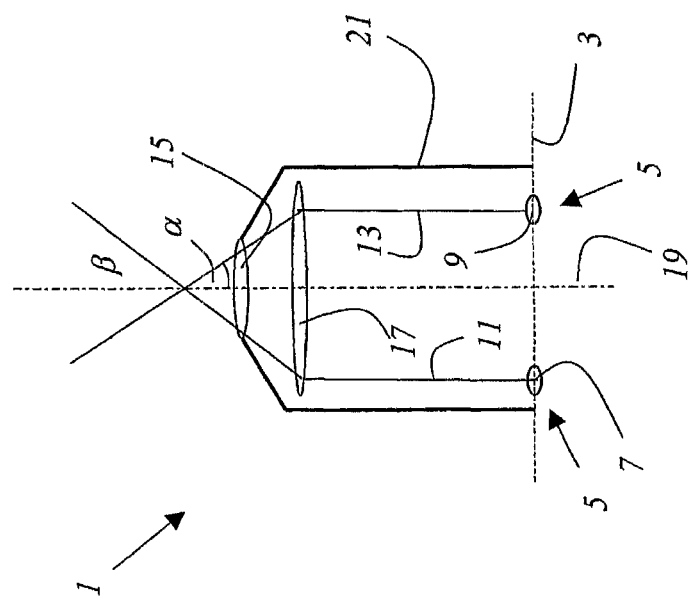
FIG. 1 shows an objective according to the invention.

FIG. 1 shows an objective 1 according to the invention that can be used for total internal reflection microscopy. A light source 5, which is formed out of a first single-light source 7 and a second single-light light source 9, is arranged in the rear focal plane 3 of the objective 1. The first single-light source 7 comprises a light emitting diode (LED), while the second single-light source comprises a semiconductor laser. The objective comprises a front lens 15 and a further lens 17. The illumination light 11 and illumination light 13, respectively, exit the microscope objective at an angle $\beta$ and at an angle $\alpha$, respectively, to the optical axis 19. The angle is adjustable by moving the single-light source 7 and by moving the single-light source 9, respectively, within the rear focal plane. For this purpose, the distance of the single-light source 7 and of the further single-light source 9, respectively, to the optical axis is changed with a mechanical positioner, which is not shown. The objective 1 exhibits an objective housing 21.

Figure 2:
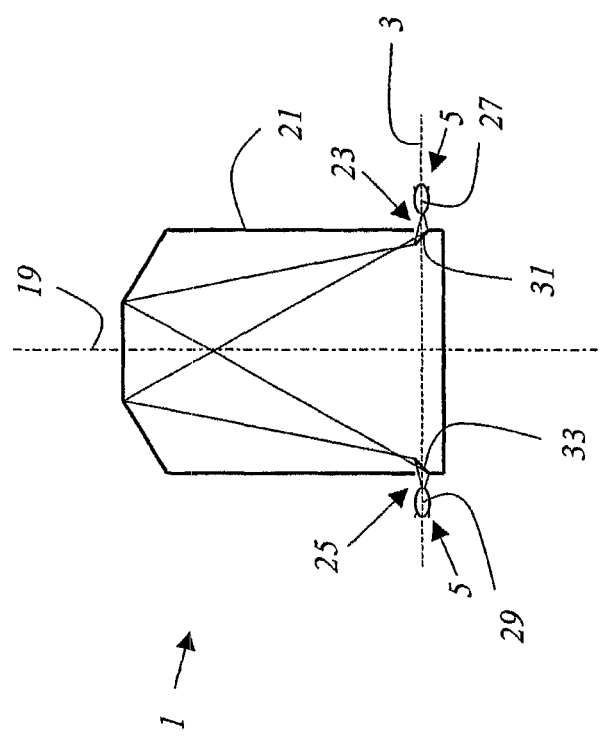
FIG. 2 shows a further objective according to the invention.

FIG. 2 shows a further objective 1 according to invention with an objective housing 21 that exhibits a first opening 23 and a further opening 25. The objective exhibits single-light sources 27, 29 that are arranged in the form of a ring, and that belong to a light source 5. The light source 5 is arranged outside the objective housing 21, and the light from the light source 5 is coupled via the first opening 23 and via the second opening 25, as well as via further openings in the objective housing 21, which are not shown. For coupling, deflectors 31, 33, which deflect the light from the light source 5 into the further beam path of the objective 1, are provided in the area of the rear focal plane 3 of the objective 1.

Figure 3:
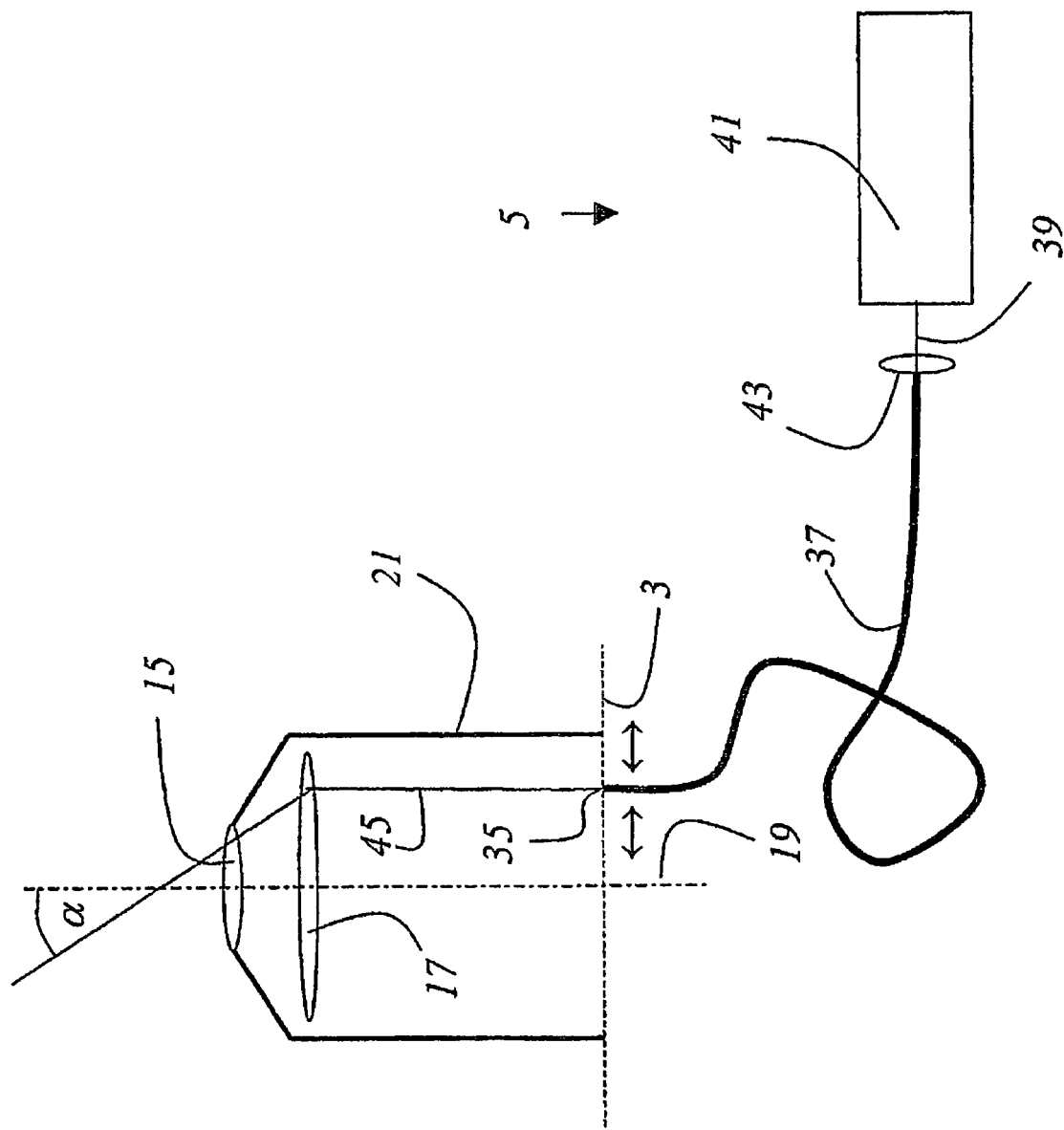
FIG. 3 shows a further objective according to the invention.

FIG. 3 shows a further objective 1 according to the invention with an objective housing 21, behind the rear focal plane of which is arranged the outgoing end 35 of an illumination light-conducting fiber 37. The illumination light 39 from a light source 5, which is implemented as a laser 41, is coupled in the illumination light-conducting fiber 37 with the help of a coupling optic 43. The distance of the outgoing end 35 of the illumination light-conducting fiber 37 to the optical axis 19 of the objective 1 is mechanically adjustable. For this purpose, the outgoing end of the illumination light-conducting fiber is movably arranged within the rear focal plane 3 of the objective 1. The illumination light 45 that exits the illumination light-conducting fiber 37 exits the objective 1 at an angle $\alpha$ to the optical axis 19. This angle is adjustable by adjusting the position of the outgoing end 35 of the illumination light-conducting fiber 37 within the rear focal plane 3 of the objective 1.

Figure 4:
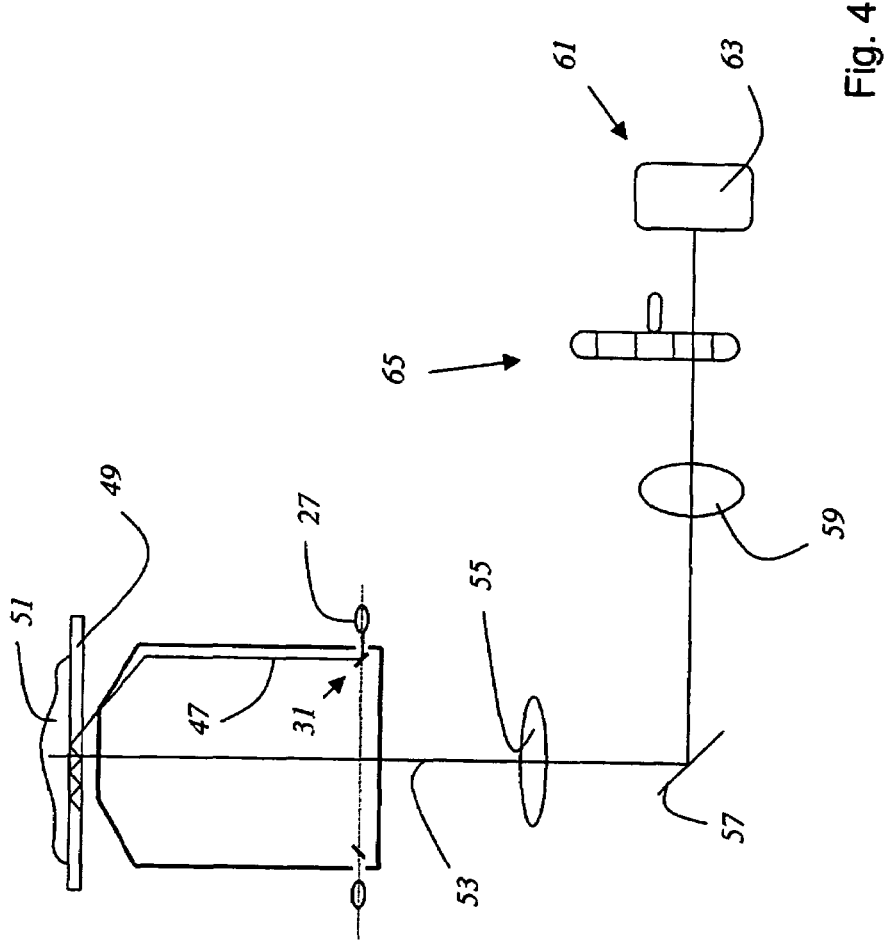
FIG. 4 shows a microscope according to the invention.

FIG. 4 shows a microscope according to the invention with an objective 1 as described in FIG. 2. The illumination light 47 emitted by the single-light source 27 evanescently illuminates the sample 51, which is arranged on the cover glass 49. The detection light 53 that exits from the sample passes through the microscope objective 1 to the tube lens 55, and is then deflected by the mirror 57 and via the optic 59 to the detector 61, which is implemented as a CCD camera 63. A filter wheel 65 with several different single filters from which to select the detection region is arranged before the detector 61.

Figure 5:
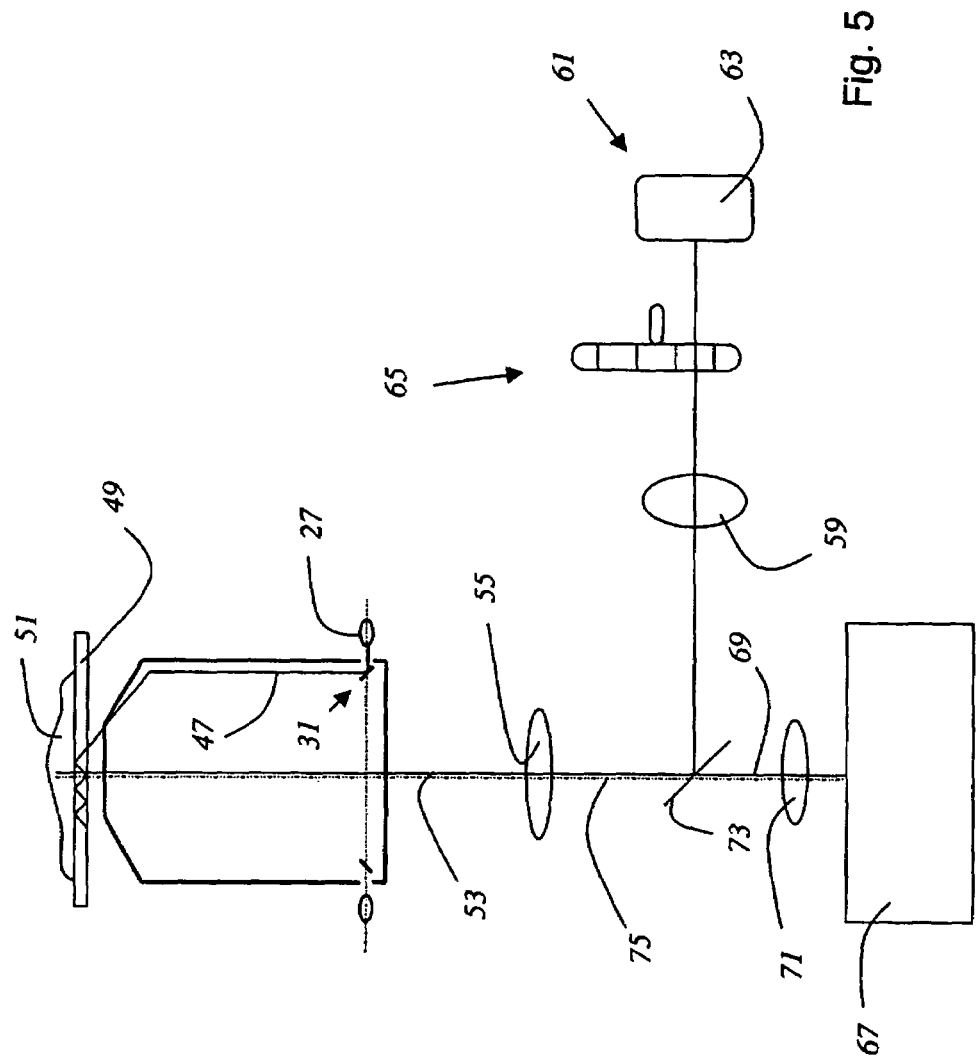
FIG. 5 shows a further microscope according to the invention.

FIG. 5 shows a further microscope according to the invention, which is implemented similarly to the microscope represented in FIG. 4. In addition, a confocal scanner 67 is provided, the scanning light beam 69 of which is coupled in the beam path of the microscope after passing through the scanning lens 71 via the beam splitter 73. The scanning light beam 69, which is indicated by broken lines in the figure, passes through the tube lens and the microscope objective to the sample 51. The scanning light beam 69 can, for example, be used to excite the sample in addition to the evanescent field, and/or to manipulate the sample. Confocal imaging of the sample may be accomplished simultaneous to imaging the sample with the detector 61, whereby the confocal scanner 67 receives detection light 75 (broken lines) exiting from the sample, which passes along the reverse light path as the scanning beam 69 reaches the confocal scanner 67.

While this invention has been particularly shown and described with references to preferred embodiments thereof, it will be understood by those skilled in the art that various changes in form and details may be made therein without departing from the scope of the invention encompassed by the appended claims.

The invention claimed is:
1. An objective for total internal reflection microscopy of a sample positioned on a cover, comprising:
a light source comprising several single-light sources arranged in a circle, positioned within the rear focal plane of the objective to cause total internal reflection of illumination light from the light source in the cover to evanescently illuminate the sample, the light source emitting the illumination light into the objective at different wavelengths; or at least one deflector deflecting illumination light from a light source into the objective and positioned within the rear focal plane of the objective to cause total internal reflection of the illumination light from the light source in the cover to evanescently illuminate the sample; or an outgoing end of an illumination light-conducting fiber emitting illumination light from a light source into the objective and positioned within the rear focal plane of the objective to cause total internal reflection of the illumination light from the light source in the cover to evanescently illuminate the sample.

2. The objective according to claim 1, wherein the single-light sources can be switched on and off independently of each other.

3. The objective according to claim 1, wherein an optic device is provided that focuses the light from the light source onto the deflector.

4. The objective according to claim 1, wherein partial coating of an objective element is formed as the deflector.

5. The objective according to claim 4, wherein the partial coating comprises a reflective coating.

6. The objective according to claim 1, wherein light from the light source exits the objective after passing through the objective at an adjustable angle to an optical axis of the objective.

7. The objective according to claim 6, wherein the position
of the light source or
of the at least one deflector or
of the outgoing end
is changeable within the rear focal plane.

8. The objective according to claim 6, wherein the angle of illumination light of different wavelengths is different.

9. The objective according to claim 1, wherein at least one of the several single-light sources is a laser, a semiconductor laser, or an LED.

10. A microscope for total internal reflection microscopy of a sample positioned on a cover with a light source and with an objective,
wherein the light source or
at least one deflector deflecting illumination light from the light source into the objective or
an outgoing end of an illumination light-conducting fiber connected to the light source
is positioned within the rear focal plane of the objective to cause total internal reflection of illumination light from the light source in the cover to evanescently illuminate the sample.

11. The microscope according to claim 10, wherein the light source comprises at least one laser.

12. The microscope according to claim 10, wherein the light source comprises several single-light sources that are arranged in the form of a ring.

13. The microscope according to claim 12, wherein the single-light sources can be switched on and off independently of each other.

14. The microscope according to claim 10, wherein the light source comprises several single-light sources, which emit illumination light at different wavelengths.

15. The microscope according to claim 14, wherein the angle of illumination light of different wavelengths is different.

16. The microscope according to claim 10, wherein an optic is provided that focuses the light from the light source onto the deflector.

17. The microscope according to claim 10, wherein a partial coating of an objective element is formed as the deflector.

18. The microscope according to claim 17, wherein the partial coating comprises a reflective coating.

19. The microscope according to claim 10, wherein light from the light source exits the objective after passing through the objective at an adjustable angle to an optical axis of the objective.

20. The microscope according to claim 19, wherein the position of the light source or of the at least one deflector or of the outgoing end is changeable within the focal plane.

21. The microscope according to claim 10, further comprising a detector detecting synchronously when the light source or single-light sources are switched on.

22. The microscope according to claim 10, comprising a confocal scanning microscope.

23. Use of a microscope according to claim 10 for photo-activation and/or caged compound release and/or FRAP (fluorescence recovery after photobleaching).

* * * * *